United States Patent
Ahn

(10) Patent No.: US 6,191,823 B1
(45) Date of Patent: Feb. 20, 2001

(54) ANALOG/DIGITAL COLOR VIDEO APPARATUS AND METHOD FOR ADJUSTING ATTRIBUTES OF A COLOR VIDEO SIGNAL USING DIGITAL SIGNAL PROCESSING

(75) Inventor: Duck-Yong Ahn, Suwon (KR)

(73) Assignee: Samsung Electronics Co., Ltd., Kyungki-do (KR)

( * ) Notice: Under 35 U.S.C. 154(b), the term of this patent shall be extended for 0 days.

(21) Appl. No.: 09/111,590

(22) Filed: Jul. 7, 1998

(30) Foreign Application Priority Data

Jul. 7, 1997 (KR) .................................. 97-31278

(51) Int. Cl.$^7$ .............................. H04N 9/74; H04N 5/46
(52) U.S. Cl. .................... 348/554; 348/577; 348/581; 348/582; 348/649; 348/572; 345/150; 345/154; 345/127
(58) Field of Search ...................... 348/581, 445, 348/565, 582, 571, 572, 556, 557, 558, 566, 555, 554, 569, 659, 660, 645, 646, 678, 679, 739, 576, 577, 562, 649; 345/150, 154, 127; H04N 9/74

(56) References Cited

U.S. PATENT DOCUMENTS

| 5,333,010 | * | 7/1994 | Nakamura | 348/649 |
| 5,450,500 | * | 9/1995 | Bret | 348/649 |
| 5,452,018 | * | 9/1995 | Capitant et al. | 348/649 |
| 5,485,203 | * | 1/1996 | Nakamura | 348/576 |
| 5,543,819 | * | 8/1996 | Farwell et al. | 345/150 |
| 5,646,866 | * | 7/1997 | Coelho et al. | 364/154 |
| 5,712,659 | * | 1/1998 | Adachi | 345/150 |
| 5,790,096 | * | 8/1998 | Hill, Jr. | 345/150 |
| 5,844,542 | * | 12/1998 | Inoue et al. | 345/150 |
| 5,912,994 | * | 6/1999 | Norton | 382/283 |
| 5,933,130 | * | 8/1998 | Wagner | 345/150 |
| 5,953,074 | * | 9/1999 | Reddy | 348/558 |

FOREIGN PATENT DOCUMENTS

| 4-10784 | 1/1992 | (JP) | H04N/5/57 |
| 4-207291 | 7/1992 | (JP) | H04N/8/64 |
| 8-98105 | 4/1996 | (JP) | H04N/5/46 |
| 9-116832 | 5/1997 | (JP) | H04N/5/57 |

* cited by examiner

Primary Examiner—Mark R. Powell
Assistant Examiner—Wesner Sajous
(74) Attorney, Agent, or Firm—Sughrue, Mion, Zinn, Macpeak & Seas, PLLC

(57) ABSTRACT

An analog/digital color video apparatus for adjusting attributes of a color image contained in an analog video signal and a digital video signal and visually displaying an attribute-adjusted color image on a display is provided. When an attribute of an analog video signal having a relatively lower definition is adjusted, the analog/digital color video apparatus converts the analog video signal into a digital signal and adjusts the attribute of the digitized video signal. When an attribute of the digital video signal having a relatively higher definition is adjusted, an attribute of a color image contained in the digital video signal is adjusted without a supplementary signal conversion process such as A/D conversion and D/A conversion. Thus, the analog/digital TV prevents quantization noise which can be occurred in the process of adjusting attributes of the color image.

12 Claims, 2 Drawing Sheets

ANALOG/DIGITAL COLOR VIDEO APPARATUS AND METHOD FOR ADJUSTING ATTRIBUTES OF A COLOR VIDEO SIGNAL USING DIGITAL SIGNAL PROCESSING

BACKGROUND OF THE INVENTION

1. Field of the Invention

The present invention relates to an analog/digital color video apparatus and method for adjusting attributes of a color image contained in an analog video signal and a digital video signal, and visually displaying an attribute-adjusted video signal through a display, and more particularly, to an analog/digital color video apparatus and method for visually displaying an attribute-adjusted video signal through a flat type display.

2. Description of the Related Art

A conventional color video apparatus employs a flat type display to provide a high quality of image. Flat type displays such as a plasma display and a liquid crystal display use a digitized video signal as an input signal.

FIG. 1 is a block diagram showing the structure of a conventional analog/digital TV using a flat type display and which is compatible with both a digital signal and an analog signal. The conventional analog/digital TV comprises a first attribute adjust portion 10 for receiving an analog video signal and adjusting attributes of the received analog video signal, a second attribute adjust portion 20 for receiving a digital video signal and adjusting attributes of the received digital video signal, a switch 30, an analog-to-digital (A/D) converter 40 and a flat type display 50. For convenience of explanation, it is assumed that the analog video signal received by the first attribute adjust portion 10 is a color video signal in accordance with an NTSC (National Television System Committee) standard, and the digital video signal received by the second attribute adjust portion 20 is an HDTV (High Definition Television) video signal which is obtained through a demultiplexing and decoding process.

The first attribute adjust portion 10 receives an analog video signal and adjusts attributes of the received analog video signal. A chroma processor 11 in the first attribute adjust portion 10 generates a luminance signal Y, a first color difference signal R-Y and a second color difference signal B-Y from the received analog video signal. A first matrix circuit 13 generates color signals R, G and B from the luminance signal Y, the first color difference signal R-Y and the second color difference signal B-Y, using a predetermined matrix equation. A first attribute adjuster 15 receives and processes the color signals R, G and B according to a attribute control command input from a control panel 300 by a user and controls attributes such as sharpness, contrast, tint and brightness to then output the attribute-adjusted color signals R, G and B to the switch 30. The second attribute adjust portion 20 receives a demultiplexed and decoded digital video signal and adjusts the attributes of the received digital video signal. A digital-to-analog (D/A) converter 21 in the second attribute adjust portion 20 converts the received digital video signal into an analog signal. A second matrix circuit 23 generates color signals R, G and B from the output signal of the D/A converter 21, using a predetermined matrix equation. A second attribute adjuster 25 processes the color signals R, G and B according to attribute control command input from a control panel 300 by a user and adjusts attributes such as sharpness, contrast, tint and brightness to then output the attribute-adjusted color signals R, G and B to the switch 30. The switch 30 outputs the color signals R, G and B received from the first attribute adjuster 15 or the second attribute adjuster 25 to the A/D converter 40, according to a display mode select command input from the control panel 300 by a user. The A/D converter digitizes the color signals R, G and B received from the switch 30. The flat type display 50 combines images contained in the digitalized color signals R, G and B and visually displays the combined color image thereon.

The analog/digital TV of FIG. 1 converts a digital video signal into an analog signal in order to adjust the attributes of the digital video signal, and then converts the analog-converted signal back to a digital signal for the flat type display 50 which uses the digital signal as an input signal. However, the analog/digital TV of FIG. 1 generates quantization noise which is caused by the A/D conversion process. The quantization noise deteriorates the quality of a color image displayed on the flat type display 50.

SUMMARY OF THE INVENTION

To solve the above problems, it is an object of the present invention to provide an analog/digital color video apparatus for adjusting both attributes of an analog video signal and a digital video signal using digital signal processing, to then eliminate deterioration of quality an image to be displayed.

It is another object of the present invention to provide a method of for adjusting both attributes of an analog video signal and a digital video signal using digital signal processing.

To accomplish the above object of the present invention, there is provided an analog/digital color video apparatus for an analog video signal and a digital video signal, the analog/digital color video apparatus comprising:

a control panel for receiving a display mode select command and an attribute control command from a user; an analog-to-digital converter for receiving and converting an analog video signal into a digital video signal; a format converter for receiving the digital video signal and the analog video signal digitalized by the A/D converter and converting a frame format of the digital video signal and the digitized analog video signal into a frame format of a desired size, according to the display mode select command; a digital attribute adjuster for adjusting the attribute of the video signal format-converted by the format converter; and a display for visually displaying a color image of the video signal attribute-adjusted by the digital attribute adjuster.

There is also provided a color video signal attribute adjust method for adjusting attributes of an analog video signal and a digital video signal to be visually displayed on a display, the color video signal attribute adjust method comprising the steps of:

(a) receiving a display mode select command and an attribute control command from a user;

(b) converting an analog video signal into a digital video signal;

(c) converting the frame formats of the digitized analog video signal in step (b) and the digital video signal into a predetermined frame format, according to the display mode select command; and (d) adjusting the attribute of the format-converted video signal in step (c), according to the attribute control command.

BRIEF DESCRIPTION OF THE DRAWINGS

The above objects and advantages of the present invention will be apparent by describing the structure and operation thereof in detail with reference to the attached drawings in which.

DETAILED DESCRIPTION OF THE PREFERRED EMBODIMENT

A preferred embodiment of the present invention will be described with reference to the accompanying drawing.

Figure 1:
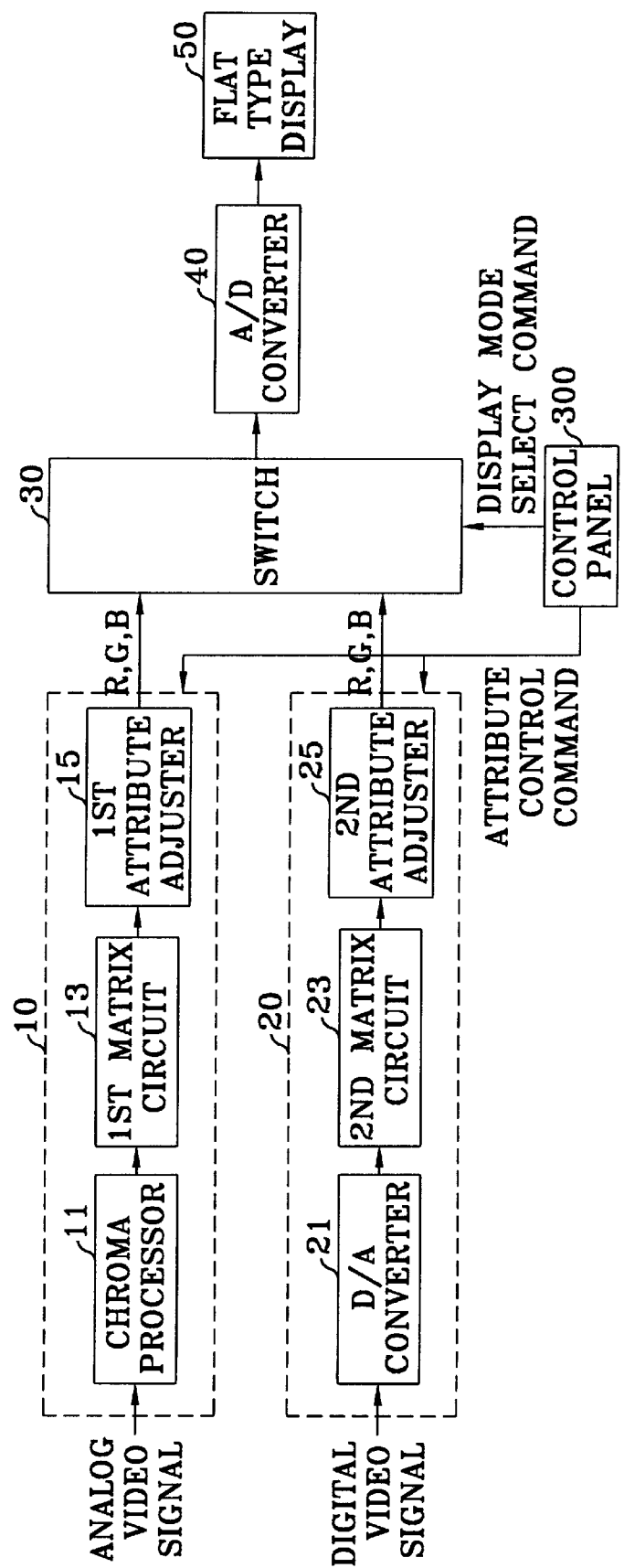
FIG. 1 is a block diagram showing the structure of a conventional analog/digital TV using a flat type display.
Figure 2:
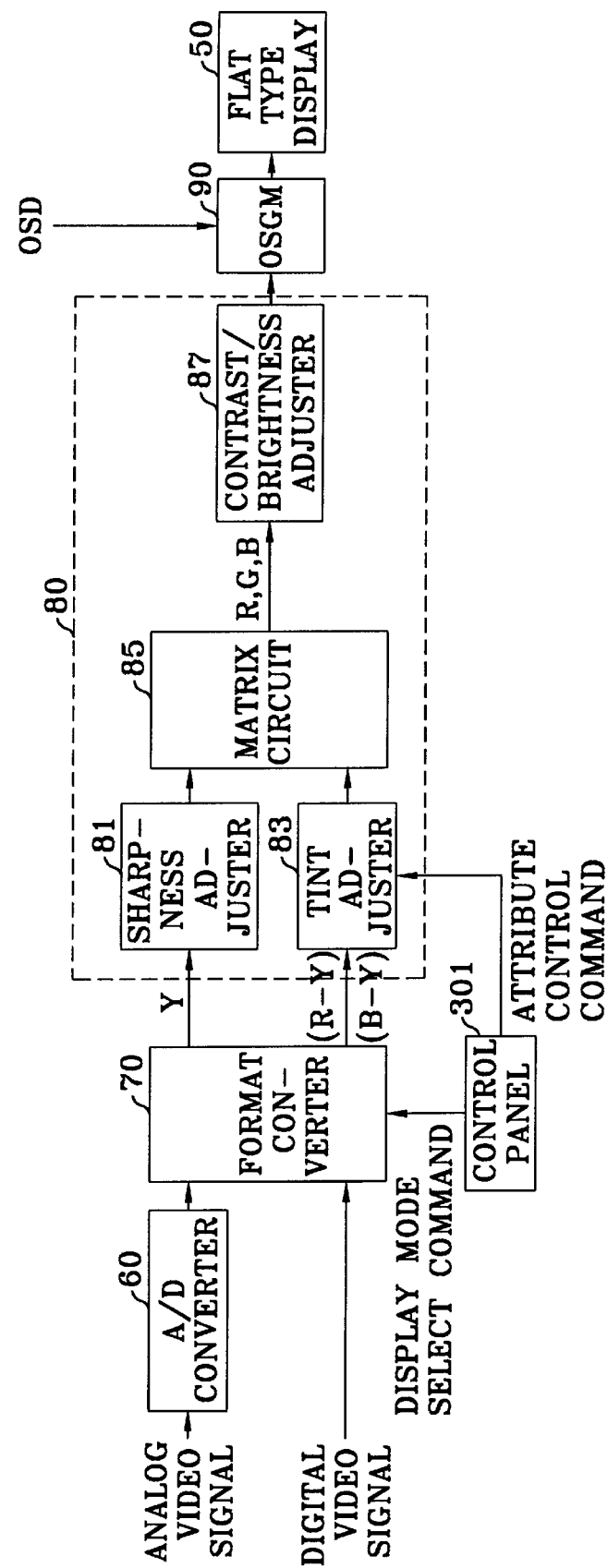
FIG. 2 is a block diagram showing the structure of an analog/digital TV using a flat type display according to an embodiment of the present invention.

FIG. 2 shows the structure of an analog/digital TV using a flat type display according to an embodiment of the present invention. The analog/digital TV comprises an A/D converter 60, a format converter 70, a digital attribute adjust portion 80, an on-screen graphic mixer (OSGM) 90 and a flat type display 50. For convenience of explanation, it is assumed that an analog video signal received by the A/D converter 60 is a video signal contained in a broadcasting signal in accordance with the NTSC standard, and a digital video signal received by the format converter 70 is an HDTV video signal which is obtained through a demultiplexing and decoding process.

The A/D converter 60 analog-to digital converts the received analog video signal and outputs the digitized video signal to the format converter 70. The format converter 70 format-converts the digitized analog video signal received from the A/D converter 60 and a digital video signal received from a video decoder (not shown), according to a user's display mode select command input from a control panel 301. In operation, when a display mode select command for displaying a color image contained in the analog video signal or the digital video signal is input from the control panel 301, the format converter 70 receives the selected video signal and converts a frame format of the received video signal into a frame format according to the size of a viewing surface on the flat type display 50. Also, when a display mode select command for displaying a picture-in-picture (PIP) image, for example, when a display mode select command for displaying a color image contained in the analog video signal as a main picture in the PIP image and displaying a color image contained in the digital video signal as a sub-picture in the PIP image is input from the control panel 301, the format converter 70 converts the frame format of the digitized analog video signal received from the A/D converter 60 into a frame format according to the size of the main picture, and converts the frame format of the digital video signal received from the video decoder (not shown) into a frame format according to the size of the sub-picture. The digital attribute adjust portion 80 adjusts an attribute of the color image contained in the digitized analog video signal and an attribute of the color image contained in the digital video signal received from the format converter 70, according to a user's attribute control command applied from the control panel 301. A sharpness adjuster 81 in the digital attribute adjust portion 80 adjusts a value of luminance signal Y of the digitized analog video signal and digital video signal received from the format converter 70 in order to adjust the sharpness of the color image to be displayed on the flat type display 50. A tint adjuster 83 adjusts a value of a first color difference signal R-Y and a value of a second color difference signal B-Y of the video signal received from the format converter 70 in order to adjust the tint of a color image to be displayed on the flat type display 50. A matrix circuit 85 receives the luminance signal Y adjusted in the sharpness adjuster 81 and the first and second color difference signals R-Y and B-Y adjusted in the tint adjuster 83, and then generates color signals R, B and B from the received signals Y, R-Y and B-Y, using a predetermined matrix equation. A contrast/brightness adjuster 87 adjusts the values of the color signals R, G and B received from the matrix circuit 85 in order to adjust the contrast and brightness of a color image to be displayed on the flat type display 50, and then outputs the contrast and brightness-adjusted signals to the OSGM 90. The OSGM 90 inserts on-screen character data indicating a current operating status of the TV into a predetermined position of the received color signals R, G and B, and then outputs the result to the flat type display 50. The flat type display 50 combines the color signals R, G and B received from the OSGM 90 in which the on-screen character data are included, and visually displays the color image constituted by combination of these color signals thereon.

In the analog/digital TV shown in FIG. 2, in order to adjust the attributes of a color image contained in analog video signals of a PAL (Phase Alternation by Line) standard or an SECAM (Sequential Couleur a Memoire) standard as well as an NTSC standard, it is apparent to a person skilled in the art that the format converter 70 can be replaced by a block for converting the frame format of the video signal contained in the analog broadcasting signal of the PAL standard or SECAM standard into a predetermined frame format.

As described above, the analog/digital TV according to an embodiment of the present invention converts an analog video signal of a relatively lower quality of image into a digital signal, and adjusts the attributes of the digitalized analog video signal, and also adjusts the attributes of the high definition digital video signal using digital signal processing. Thus, the present invention prevents a quality of an image of the digital video signal from being deteriorated due to quantization noise.

While only a certain embodiment of the invention has been specifically described herein, it will be apparent that numerous modifications may be made thereto without departing from the spirit and scope of the invention.

What is claimed is:

1. An analog/digital color video apparatus for adjusting attributes of an analog video signal and a digital video signal, the analog/digital color video apparatus comprising:

a control panel for inputting a display mode select command and an attribute control command from a user;

an analog-to-digital converter for receiving and converting an analog video signal into a digital video signal;

a format converter for receiving a digital video signal and the digitized analog video signal converted by the A/D converter and converting a frame format of the digital video signal or the digitized analog video signal into a frame format of a desired size, according to the display mode select command;

a digital attribute adjuster for adjusting attributes of the digitized analog video signal, or the digital video signal, format-converted by the format converter; and a display for visually displaying a color image of the digitized analog video signal, or the digital video signal, attribute-adjusted by the digital attribute adjuster.

2. The analog/digital color video apparatus according to claim 1, wherein said format converter receives and format-converts both the digitalized analog video signal and the digital video signal if the display mode select command corresponds to the display of a picture-in-picture (PIP) image, and receives and format-converts only the digitized analog video signal or the digital video signal if the display mode select command corresponds to the display of only one of the digitized analog video signal or the digital video signal.

3. The analog/digital color video apparatus according to claim 1, wherein said digital attribute adjuster comprises:

a sharpness adjuster for adjusting a value of a luminance signal (Y) of the digitized analog video signal or the digital video signal received from the format converter in order to adjust sharpness of the color image to be displayed on the display;

a tint adjuster for adjusting values of a first color difference signal (R-Y) and a second color difference signal (B-Y) of the digitized analog video signal or the digital video signal received from the format converter in order to adjust tint of the color image to be displayed on the display; and a matrix circuit for receiving the luminance signal (Y) adjusted in the sharpness adjuster and the first and second color difference signals (R-Y and B-Y) adjusted in the tint adjuster, and generating color signals (R, G and B) from the received signals (Y, R-Y and B-Y), using a predetermined matrix equation.

4. The analog/digital color video apparatus according to claim 3, further comprising a contrast/brightness adjuster for adjusting values of the color signals (R, G and B) in order to adjust contrast and brightness of the color image displayed to be on the display.

5. The analog/digital color video apparatus according to claim 1, wherein said display is a flat type display.

6. The analog/digital color video apparatus according to claim 1, wherein the analog video signal is a video signal according to an NTSC standard.

7. The analog/digital color video apparatus according to claim 1, wherein the analog video signal is a video signal according to an SECAM standard.

8. The analog/digital color video apparatus according to claim 1, wherein the analog video signal is a video signal according to a PAL standard.

9. A color video signal attribute adjust method for adjusting attributes of an analog video signal and a digital video signal to be visually displayed on a display, the color video signal attribute adjust method comprising the steps of:

(a) receiving a display mode select command and an attribute control command input by a user;

(b) converting an analog video signal into a digital video signal;

(c) converting frame formats of the digitized analog video signal and a digital video signal into a predetermined frame format, according to the display mode select command; and (d) adjusting attributes of the format-converted digitized analog video signal or the format-converted digital video signal, according to the attribute control command.

10. The color video signal attribute adjust method according to claim 9, wherein said step (c) further comprises format-converting both the digitized analog video signal and the digital video signal when the display mode select command corresponds to the display of a picture-in-picture (PIP) image, and format-converting only the digitized analog video signal or the digital video signal when the display mode select command corresponds to the display of only one of the analog video signal or the digital video signal.

11. The color video signal attribute adjust method according to claim 10, wherein said step (d) comprises the sub-steps of:

(d1) adjusting a value of a luminance signal of the digitized analog video signal or the digital video signal, whose format has been converted in step (c), in order to adjust sharpness of the video signal to be displayed;

(d2) adjusting values of first and second color difference signals (R-Y and B-Y) of the digitized analog video signal or the digital video signal, whose format has been converted in step (c), in order to adjust the tint of the video signal to be displayed; and (d3) generating color signals (R, G and B) from the luminance signal (Y) and the first and second color difference signals (R-Y and B-Y) using the predetermined matrix equation.

12. The color video signal attribute adjust method according to claim 11, wherein said step (d) further comprises the sub-step (d4) of adjusting the values of the color signals (R, G and B) generated in step (d3) in order to adjust the contrast and brightness of the digitized analog video signal or the digital video signal to be displayed.

* * * * *